United States Patent [19]

Lee, Jr.

[11] 4,423,176

[45] Dec. 27, 1983

[54] MOLDING COMPOSITIONS COMPRISING POLYPHENYLENE ETHER, POLYSULFONE AND VINYL AROMATIC-DIENE BLOCK COPOLYMER

[75] Inventor: Gim F. Lee, Jr., Albany, N.Y.

[73] Assignee: General Electric Company, Pittsfield, Mass.

[21] Appl. No.: 262,702

[22] Filed: May 11, 1981

Related U.S. Application Data

[63] Continuation of Ser. No. 106,921, Dec. 26, 1979, abandoned.

[51] Int. Cl.$^3$ ................................................ C08K 5/51
[52] U.S. Cl. ..................................... 524/153; 525/92; 525/93
[58] Field of Search ..................... 525/92, 93; 524/153

[56] References Cited

U.S. PATENT DOCUMENTS

| | | | |
|---|---|---|---|
| 3,257,357 | 6/1966 | Stamatoff | 526/86 |
| 3,257,358 | 6/1966 | Stamatoff | 526/86 |
| 3,306,874 | 2/1967 | Hay | 526/86 |
| 3,306,975 | 2/1967 | Hay | 526/86 |
| 3,595,942 | 3/1966 | Wald et al. | 526/86 |
| 3,639,506 | 2/1972 | Hoof | 525/68 |
| 4,080,403 | 3/1978 | Gergen et al. | 525/93 |

FOREIGN PATENT DOCUMENTS 6716106  3/1963  Netherlands ........................ 525/93

OTHER PUBLICATIONS

The Encyclopedia of Polymer Science & Technology, vol. 11, New York International Publishers, 1969, pp. 447–463.

*Primary Examiner*—J. Ziegler
*Attorney, Agent, or Firm*—Hedman, Casella, Gibson, Costigan & Hoare

[57] ABSTRACT

Molding compositions comprising a polyphenylene ether, a polysulfone, and a selectively hydrogenated linear or radial block copolymer comprising vinyl aromatic compound and dienes, optionally further including a plasticizer, possess excellent impact resistance, and heat aging resistance.

13 Claims, No Drawings

MOLDING COMPOSITIONS COMPRISING POLYPHENYLENE ETHER, POLYSULFONE AND VINYL AROMATIC-DIENE BLOCK COPOLYMER

CROSS-REFERENCE TO RELATED APPLICATION

This is a continuation of application Ser. No. 106,921, filed Dec. 26, 1979, abandoned.

The present invention relates to novel molding compositions based on polyphenylene ether—polysulfone modified by a content of a block polymer as agent imparting superior physical properties to molded articles prepared therefrom. The invention includes the novel molding compositions themselves with and without conventional molding composition additives, methods of preparing the compositions, molded articles made from the compositions, and methods of making the moldings.

BACKGROUND OF THE INVENTION

From Netherlands patent publication No. 6716106, it is known that molding compositions based on one or more of the thermoplastic polyphenylene ethers and one or more of the thermoplastic polysulfones, when molded at elevated temperature and pressure, provide shaped articles which possess very satisfactory impact strength. However, samples molded from such compositions show phase incompatibility in differential scanning calorimetry tests and the moldings are laminar. It is obvious if this shortcoming is avoided, then the compositions will provide molded articles which are superior in the above respects. It has now been discovered that the impact properties and heat age resistance is increased, and lamination is decreased or even eliminated, when the molding composition has a content of a selectively hydrogenated linear or radial thermoplastic block copolymer which consists essentially of vinyl aromatic compound, e.g., styrene and a diene, e.g. butadiene.

It has further been found that properties, especially impact strength and processability can be further improved by adding an effective amount of a plasticizer, e.g. triphenyl phosphate. The preferred plasticizers also function to enhance the flame retardancy of the new compositions.

Suitable block copolymers are commercially available at low cost. The present invention thus substantially expands the field of utility of polyphenylene ether—polysulfone moldings in an economical way.

DESCRIPTION OF THE INVENTION

According to the present invention, there are provided molding compositions comprising a polyphenylene either, a polysulfone, and an impact improving amount of a selectively hydrogenated block copolymer of the linear or radial teleblock type comprising blocks of polymerized vinyl aromatic compound and blocks of polymerized diene. The polyphenylene ethers (also termed "polyphenylene oxides" and "PPO") are known as a class (see Hay U.S. Pat. Nos. 3,306,874 and 3,306,875 and Stamatoff U.S. Pat. Nos. 3,257,357 and 3,257,358, which disclose a number of suitable members of the class and methods for their preparation). They are composed of repeating units having the theoretical formula:

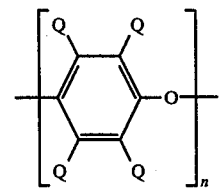

wherein the oxygen ether atom of one unit is connected to the benzene nucleus of the next repeating unit, n is a positive integer and is at least 50, and each Q is a monovalent substituent selected from the group consisting of hydrogen, halogen, hydrocarbon radicals free of a tertiary α-carbon atom, halohydrocarbon radicals having at least two carbon atoms between the halogen atom and phenyl nucleus and being free of a tertiary α-carbon atom, and halohydrocarbonoxy radicals having at least 2 carbon atoms between the halogen atom and phenyl nucleus and being free of tertiary α-carbon atom.

The polymer can contain minor percentages of other units so long as these units do not significantly alter the essential character of the polymer.

Examples of suitable polymers in this group are disclosed in the above-identified patents and additional suitable polyphenylene ethers can be prepared in accordance with the methods shown there. Polymers in which the Q's in the 2,6-position are alkyl of from 1 to 4 carbon atoms, the remaining Q's being hydrogen, are preferred. Poly-(2,6-dimethyl-1,4-phenylene) ether is especially preferred because of its very satisfactory compatibility with the other components of the composition. The latter polymer is commercially available, e.g., from General Electric Co., Pittsfield, Mass.

The polysulfones which are present in the compositions of the present invention are also a known class and can be prepared by reacting the sodium salt of a bis(hydroxyphenyl)propane with an equimolar quantity of a dichlorodiphenyl sulfone. See The Encyclopedia of Polymer Science and Technology, Vol. 11, New York, Interscience Publishers, 1969, pages 447–463, the disclosure of which is incorporated herein by reference.

When the reaction is performed with 2,2-bis(4-hydroxyphenyl)propane and 4,4'-dichlorodiphenyl sulfone, a linear polymer is obtained which is composed of, typically, from 50 to 80 of the following recurring units:

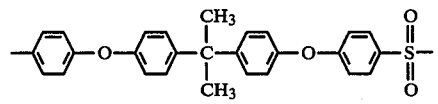

The polymerization can be terminated at any desired point by adding a monofunctional chain stopper, for example methyl chloride. The molecular weight of the polymer can thereby be controlled, with production of a polymer of good thermal stability.

The polymer when molded forms rigid strong thermoplastic pieces which are resistant to deflection by heat up to 345° F. and which are sufficiently stable to permit their continuous use in the atmosphere at temperatures up to 300° F. They can be heated to 500° F. for brief periods of time without significant degradation.

The phenyl and methyl groups in the formula given above can carry inert thermostable substituents, for example methoxy, ethoxy, carbethoxy, carbomethoxy, phenyl and diethylamino, in moderate number so long as these groups do not change the essential character of the polymer, or increase the flow point of the polymer substantially above the flow point of the polyphenylene ether. A suitable commercial material is the product of Union Carbide Co. known as Polysulfone P 1700.

As has been mentioned, the polysulfones are significantly effective in increasing the impact resistance of polyphenylene ether moldings when they are present in minor proportions. In the compositions of the present invention, therefore, the polysulfone is present in such proportion that the weight of the polysulfone ranges from 15 to 50 parts per 100 parts of combined polysulfone, polyphenylene ether and block copolymer.

The block copolymers which are the third principal component of the compositions of the present invention are linear or radial teleblock copolymers which are substantially composed of blocks of vinyl aromatic compounds, e.g., styrene or substituted styrenes, and blocks of diene, e.g., butadiene or isoprene. The latter blocks are the selectively hydrogenated in a post polymerization reaction which saturates the residual bonds of the polymerized diene blocks with hydrogen. The styrene blocks and the saturated rubber blocks are present in weight ratio between 90:10 and 10:90, depending on the properties desired, the styrene blocks generally providing stiffness and the saturated rubber blocks generally providing toughness. The intermediate ratio of 30:70 (styrene-butadiene) has given very satisfactory results and is therefore preferred. The block copolymers are linear or branched, (radial teleblock).

The styrene blocks may contain components such as α-methylstyrene, α-chlorostyrene, o-methylstyrene, an acrylonitrile.

The saturated rubber blocks may be blocks of staturated polyisoprene or saturated polychloroprene, but blocks of saturated butadiene are preferred because of the very satisfactory elastomeric properties which these blocks impart.

Block copolymers having selectively hydrogenated conjugated diene blocks are disclosed in Wald et al., U.S. Pat. No. 3,595,942, incorporated herein by reference. Block polymers which are suitable for use in the compositions of the present invention are sold under the trademarks Solprene 502, (Phillips), Kraton G-1651 and G-1652 (Shell). Kraton G-1651 and 1652 are linear block copolymers containing an elastomeric center block of hydrogenated poly-butadiene, and their end blocks are polystyrene; Solprene 502 is a radial teleblock copolymer of styrene and hydrogenated polybutadiene.

The polyphenylene ether and the polysulfone are respectively present in the compositions of the present invention in weight ratio between 99:1 and 1:99, again depending on the physical properties which are desired. The best combination of physical properties from the point of view of tensile strength, elongation and impact resistance appear to be obtained when a moderate amount of the polysulfone is present, and therefore the ratio range of 85:15 to 50:50 is preferred.

In preferred compositions, there will also be present a small, effective amount of a plasticizer. This will generally comprise a high boiling liquid which serves to improve processability, without at the same time lowering important properties in articles ultimately molded therefrom. Although many such plasticizers are known to be suitable for this purpose, it is preferred to use a phosphate compound, e.g., a triaryl phosphate such as triphenyl phosphate, tri-o-cresyl phosphate, and the like. These, in addition to their plasticizing effect also serve to enhance the self-extinguishing characteristics of the composition. Conventional amounts of plasticizer will be used, e.g., from 10 to 30 parts by weight per 100 parts by weight total of the compositions.

The auxiliary materials which are frequently present in thermoplastic molding compositions can be added at any convenient point in the mixing operation. These auxiliary materials include pigments such as ultramarine blue, titanium dioxide white, and carbon black; flame retardants; antioxidants; plasticizers; fillers such as whiting; and fibrous strengtheners such as asbestos fibers and glass fibers. Generally these materials are most conveniently added while the polymeric components are being mixed. If preferred, however, the auxiliary agents can be added to one of the components before the component is mixed with the other components, or they can be divided and added to two or to each of the components before the step where all the components are mixed together. Thus the materials can be added to a mixture of the polyphenylene ether and the polysulfone, before addition of the block copolymer. The proportions in which these materials are added are conventional and are not features of the invention.

The compositions can be made and molded in conventional ways. For example, the ingredients can be extrusion blended and chopped to produce molding pellets. The molding pellets can then be used in a suitable injection molding machine.

The invention is further described in the examples which follow. These examples are preferred embodiments of the invention, and are not to be constued in limitation thereof.

EXAMPLES 1-4

Compositions according to this invention is prepared by extruding the ingredients set forth in a 28 mm. Werner-Pfleiderer extruder at 550° F. and chopping the extrudate into pellets. The pellets are injection molded into test samples in a 3 oz. Newbury machine at 520° F. (cylinder) and 190° F. (mold). For examplary purposes, compositions with a plasticizer/flame retardant are also prepared, molded and tested. The results are set forth in the Table.

TABLE

Composition Comprising Polyphenylene Ether, Polysulfone, and Block Copolymer

|  | Example | | | |
|---|---|---|---|---|
|  | 1 | 2 | 3 | 4 |
| Composition (parts by weight) | | | | |
| Poly(2,6-dimethyl-1,4-phenylene) ether[a] | 45 | 45 | 60 | 60 |
| Polysulfone[b] | 40 | 40 | 20 | 20 |
| Selectively hydrogenated block copolymer of styrene and butadiene[c] | 15 | 15 | 20 | 20 |
| Plasticizer, triphenyl phosphate | — | 10 | — | 10 |
| Properties | | | | |
| Tensile elongation, % | 23 | 41 | 37 | 55 |
| Izod impact strength, ft.-lbs./in. notch | 1.0 | 2.6 | 1.4 | 18.4 |
| Gardner impact strength, in.-lbs. | <10 | 130 | 10 | 240 |
| Deflection temp. under load, °F. at 260 psi. | N.D.* | 259 | N.D. | 243 |
| Flammability rating, Underwriters' | N.D. | SE-0 | N.D. | SE-1 |

TABLE-continued

Composition Comprising Polyphenylene Ether, Polysulfone, and Block Copolymer

| | Example | | | |
|---|---|---|---|---|
| | 1 | 2 | 3 | 4 |
| Laboratory, Bulletin 94 | | | | |

*N.D.—not determined
<sup>a</sup>General Electric Co., PPO
<sup>b</sup>Union Carbide P-1700
<sup>c</sup>Shell Chemical, Kraton G The results show the beneficial effect of including the plasticizer. Especially noteworthy is the high impact strength in the notched Izod test for Example 4. In addition to the foregoing improved properties, the present compositions should heat age quite well.

Obviously, many variations will suggest themselves to those skilled in this art in light of the above, detailed disclosure. For example, the plasticizer can be omitted, and flame retardants, stabilizers, fillers, reinforcements, etc., can be added. In addition, compatible resins, such as polystyrenes particularly rubber modified high impact polystyrenes can be added. All such obvious variations are within the full intended scope of the appended claims.

I claim:

1. A molding composition comprising a polyphenylene ether, a polysulfone, an effective amount of a plasticizer consisting essentially of an aromatic phosphate and an impact strength improving amount of a selectively hydrogenated block copolymer of the linear or radial teleblock type comprising blocks of polymerized vinyl aromatic compound and blocks of polymerized diene.

2. A composition according to claim 1 wherein said polyphenylene ether comprises recurring units having the theoretical formula:

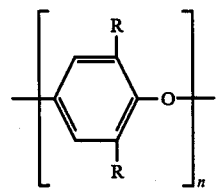

wherein R is alkyl of from 1 and 4 carbon atoms and n represents an integer larger than 50.

3. A composition according to claim 1 wherein said polysulfone comprises recurring units having the theoretical formula:

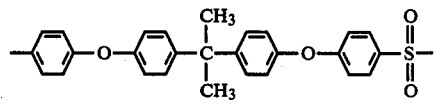

4. A composition according to claim 1, wherein said polyphenylene ether and said sulfone are present in the ratio range of 85:15 to 50:50.

5. A composition according to claim 1 wherein the ratio of the combined weight of said polyphenylene ether and said polysulfone to said block copolymer is between 99:1 and 75:25.

6. A composition according to claim 1 wherein said block copolymer is a linear copolymer.

7. A composition according to claim 1 wherein said vinyl aromatic compound is styrene and said diene is butadiene.

8. A composition according to claim 7 wherein the weight ratio of said styrene to said butadiene is 30:70.

9. A composition according to claim 1 wherein said polyphenylene ether is poly(2,6-dimethyl-1,4-phenylene ether).

10. A composition according to claim 1 having a content of an effective amount of a flame retardant.

11. A shaped article comprising a composition according to claim 1 in solid homogeneous molded form.

12. A composition according to claim 1 in which the plasticizer is a triaryl phosphate.

13. A composition according to claim 12 wherein the plasticizer is triphenyl phosphate.

* * * * *